3,142,710
PURIFICATION OF PROPYLENE
Robert P. Arganbright, Dickinson, Tex., assignor to Monsanto Company, a corporation of Delaware
No Drawing. Filed Aug. 7, 1961, Ser. No. 129,530
4 Claims. (Cl. 260—677)

The present invention relates to the purification of propylene and, more particularly, to the removal of methylacetylene and allene or propadiene from propylene.

Polypropylene is presently emerging as one of the most important commercial products on the plastics scene. The ever-increasing demand for this olefinic polymer has focused attention on the production of propylene monomer in a substantially pure state. As olefins are normally produced in refining and other operations by cracking or dehydrogenation of relatively saturated charge stocks such as ethane, propane, ethane-propane mixtures and heavier hydrocarbons, they contain impurities such as paraffinic and acetylenic compounds. Even after the usual purification of such mixtures is effected, the propylene stream still contains small amounts of impurities such as methylacetylene and allene or propadiene which cannot be tolerated in the olefin if it is to be used in catalytic polymerization processes. Conventional methods for removing these compounds are generally complicated and expensive.

It is an object of the present invention, therefore, to provide an improved process for the purification of propylene.

It is a further object of the invention to provide a relatively simple and economical process for the removal of small amounts of methylacetylene and allene or propadiene from propylene.

These and other objects and advantages of the invention will become more readily apparent from the detailed description which follows.

The method of the invention whereby the foregoing objects are attained comprises passing propylene containing minor amounts of methylacetylene and allene or propadiene together with hydrogen chloride over a catalyst comprising a mercuric halide deposited on a porous carrier particularly one having high surface activity at a temperature in the range from about 100° to about 120° C. and recovering propylene from the effluent stream essentially free from said methylacetylene and allene by a conventional distillation operation. This method for the removal of methylacetylene and allene by selective hydrochlorination has the added advantage that should it be desired, the methylacetylene can be readily recovered by dehydrochlorination of the hydrochlorination addition product. Recovery of this by-product simultaneously makes hydrogen chloride available for re-use in the process.

The following examples are presented in illustration of the process of the invention but are not to be construed as limiting it in any manner whatsoever.

*Example 1*

A ¾ in. Pyrex tube about 16 in. long wrapped with Nichrome wire for heating and covered with asbestos insulation was employed as the reactor. A thermowell containing a thermocouple for measuring temperature was centrally positioned in the reactor extending throughout its length. A catalyst consisting of approximately 12% by weight of mercuric chloride and 2% by weight of cerium chloride deposited on activated carbon was charged to the reactor. After the catalyst had been dried in a desiccator under vacuum, it was further dried in the reactor by passing nitrogen through it at a temperature of 120° C. Thereafter, hydrogen chloride and propylene containing a total of 5% by weight of methylacetylene and allene at approximate rates of 50 ml. per min. and 400 ml. per min., respectively, were passed successively through rotameters into a mixer and then through the catalyst bed while the temperature in the reactor was maintained from about 100° to about 120° C.

Effluent gas from the reactor was passed through a series of Dry Ice traps and finally through a caustic scrubber for removal of unreacted HCl. Off-gas from the scrubber was vented through a wet test meter. The product mixture recovered from the traps was analyzed by means of an infrared spectrometer and found to contain no methylacetylene and only a very small amount of allene (<0.1%).

*Example 2*

The reactor of Example 1 packed with the same catalyst was located so that the effluent gas was fed directly to a gas chromatograph sampling device so that samples could be analyzed at will. A stream of propylene containing about 94.8% propylene, 2.7% methylacetylene and 2.5% allene and one of HCl were passed at rates of 125 ml. per min. and 50 ml. per min., respectively, into a mixer and then through the catalyst bed maintained at a temperature of about 105° C. The effluent gas upon gas chromatographic analysis contained no methylacetylene nor allene.

When the rate of flow of propylene was increased to about 450 ml. per min. and the temperature in the reactor was increased to 120° C., a trace of either methylacetylene or allene appeared in the effluent gas.

Numerous variations may be introduced into the method of the invention without departing from the scope thereof. For example, the catalyst composition can be varied widely. The essential catalytic agent is a mercuric halide and particularly mercuric chloride. Other halides such as those of cerium as exemplified and other metals having an atomic weight of more than 55 and having more than one state of oxidation may be employed in conjunction with the mercuric halide. The function of such halides is to reduce the vapor pressure of the mercuric compound and thus effectively extend the life of the catalyst. Examples of such metal compounds are the halides of manganese, iron, gallium, ruthenium, palladium, tin, osmium, iridium, platinum, thallium, uranium, and europium.

In addition to mercuric halides and the stabilizing halides just mentioned, there may be included one or more halides of other metals, as for example, halides of alkali metals such as potassium and sodium and halides of alkaline earth metals, such as calcium, strontium, barium and the like.

The mercuric halide catalyst is advantageously deposited on a porous carrier, particularly one having high surface activity. Examples of such carriers are silica gel, activated charcoal, activated alumina, asbestos, diatomaceous earth and the like, with activated carbon being the preferred carrier.

The catalyst is readily prepared in a number of different ways. The mercuric halide together with any desired accompanying halides may be dissolved in the proper proportions in water that is preferably acidified with hydrochloric acid, the carrier material added, and the resulting slurry after thorough mixing, subjected to evaporation and subsequently dried. Alternatively, the slurry of carrier and salt solution can be allowed to stand until the adsorption equilibrium is attained, then filtered, and finally dried. Still another method comprises mechanically admixing the mercuric and other metallic halides, preferably while in a finely powdered condition, and then dusting these on the carrier.

A particularly suitable catalyst is the solid complex salt of a mercuric halide and a cerium halide. However, the proportions of mercuric halide and cerium halide are not critical just so long as the mercuric halide is present in an amount representing about 10% by weight of the total catalyst composition.

The temperature at which the selective hydrochlorination reaction is conducted is somewhat critical. Temperatures in the range from 100° to 120° C. are employed. Somewhat higher temperatures can be used but at temperatures above 120° C. propylene begins to react and is lost thus decreasing the efficiency of the process.

The relative proportions of propylene being purified and hydrogen chloride will vary depending upon the amount of impurities present or the degree of purification desired. Generally, for satisfactory operation, an amount of hydrogen chloride at least equivalent on a molecular basis to the amount of methylacetylene and allene present must be employed. Preferably, an excess of hydrogen chloride up to about 50% of that required for complete reaction with the acetylenic impurities is used.

Contact time is not too critical so long as a minimum time of about 4 seconds is employed.

The hydrohalogenated addition products together with any excess of HCl can be readily removed from the treated gas stream and substantially pure propylene recovered therefrom by a simple conventional distillation step.

What is claimed is:

1. A process for the purification of propylene containing minor amounts of methylacetylene and allene as impurities which comprises passing said propylene together with hydrogen chloride over a catalyst comprising a mercuric halide deposited on a porous carrier of high surface activity at a temperature in the range from about 100° to 120° C. and recoverying propylene substantially free of said methylacetylene and allene.

2. A process for the purification of propylene containing minor amounts of methylacetylene and allene as impurities which comprises passing said propylene together with hydrogen chloride over a catalyst comprising mercuric chloride deposited on activated carbon at a temperature within the range from about 100° to about 120° C. and recovering propylene substantially free of said methylacetylene and allene.

3. A process for the purification of propylene containing minor amounts of methylacetylene and allene as impurities which comprises passing said propylene together with hydrogen chloride over a catalyst comprising mercuric chloride and cerium chloride deposited on activated carbon at a temperature in the range from about 100° to about 120° C. and recovering propylene substantially free of said methylacetylene and allene.

4. The process of claim 3 wherein said catalyst contains 12% by weight of mercuric chloride and 2% by weight of cerium chloride.

References Cited in the file of this patent

UNITED STATES PATENTS

| | | |
|---|---|---|
| 2,232,869 | Robey | Feb. 25, 1941 |
| 2,370,809 | Morrell et al. | Mar. 6, 1945 |
| 2,395,957 | Breuer | Mar. 5, 1946 |
| 2,446,174 | Boyd | July 27, 1948 |
| 2,705,734 | Tramm et al. | Apr. 5, 1955 |